Oct. 4, 1932.  G. H. KOONS  1,881,363
VENTILATOR
Filed Oct. 10, 1930
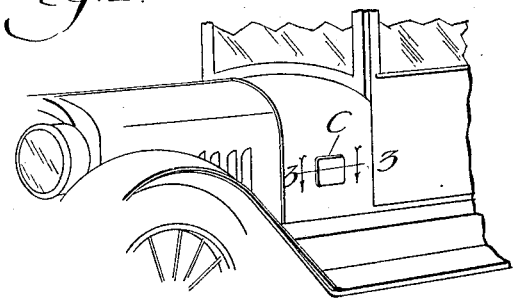
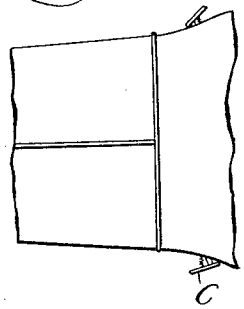
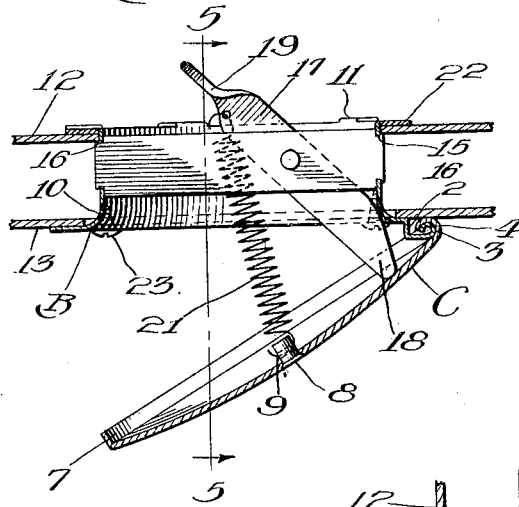
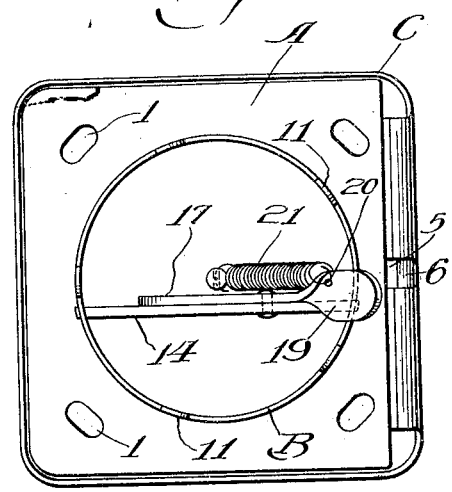
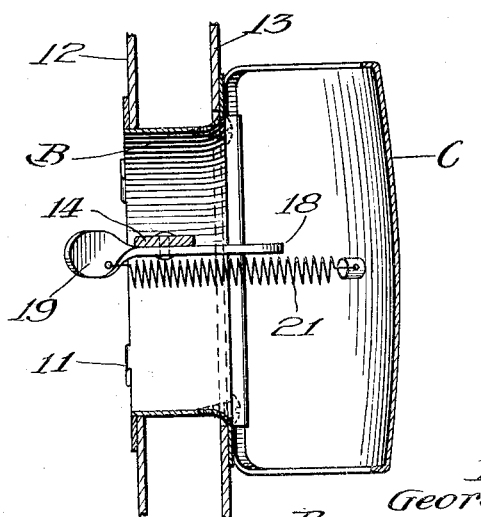
Inventor:
George H. Koons,
By ... Attys.

Patented Oct. 4, 1932

1,881,363

UNITED STATES PATENT OFFICE

GEORGE H. KOONS, OF CHICAGO, ILLINOIS

VENTILATOR

Application filed October 10, 1930. Serial No. 487,833.

This invention relates to ventilators, and more particularly to an attachment ventilator which may be applied to automobiles or other vehicles.

One of the objects of the invention is to provide a ventilator of compact and staunch construction which may readily and accurately be applied to automobiles and other vehicles. Another object is to provide a ventilator in the form of an attachment fitting which may be secured in place on a vehicle and adjusted to the proper position within a brief time and with little effort. A further object is to provide a ventilator of simple and sturdy construction which may be employed in open and closed positions without causing rattling or other noise. Other objects and advantages will appear as the specification proceeds.

The invention is fully described in the following specification and shown in the accompanying drawing, in which—

Figure 1 is a perspective view of an automobile equipped with a ventilator embodying my invention;

Fig. 2 is a broken plan view of a portion of the automobile, showing the arrangement of the ventilators on opposite sides of the car;

Fig. 3 is a sectional view, the section being taken as indicated at line 3 of Fig. 1;

Fig. 4 is an inner face view of the ventilator, the door or cover of the ventilator being in closed position; and Fig. 5 is a sectional view, the section being taken as indicated at line 5 of Fig. 3.

In the illustration given, A represents a flange or plate which is provided with a throat B formed integrally therewith and adapted to extend through the body and inner lining of an automobile. The plate A is hingedly connected to a cover or door C. Secured within the throat B are means adapted to open and close the door C.

The plate A may be formed in any suitable shape. It is provided with a series of elongated openings 1 through which bolts may be passed to secure the plate to the body of an automobile. At its rear side, the plate A is provided with a stepped-forward portion 2 which is coiled at its end 3 to form the inner member of the hinge. The corresponding rear edge portion of the cover C is similarly curved at 4 to form the outer member of the hinge. To prevent endwise movement of the telescoping hinge members, a slot 5 is formed in the hinge portion 3 and a portion of the outer hinge member 4 is turned down at 6 within the slot 5. The segment 6, together with the arrangement of the hinge members, serves as a stop to prevent backward movement of the door C beyond the position in which it stands at right angles to the body of the car.

The door C is preferably formed with an inwardly turned marginal flange 7 which is adapted to extend around the plate A and to rest directly against the body of the car. Near its central portion, the cover is provided with an opening through which is passed a rivet member 8 which is provided on its inner side with an opening 9 adapted to receive the end of a spring. The edges of the cover about the central opening grip the rivet member 8 which has been forced therethrough, and hold it rigidly in position. The outer surface of the cover member A may be plated with any suitable material, such as, for example, chromium.

The plate member A is preferably curved at the point where it joins the throat B and forms a somewhat flared or funnel-shaped mouth or opening 10. At its inner side, the throat B is provided with a plurality of ears 11 which are adapted to be turned over to engage the inner lining 12 of the car. With the flanged portion of plate A resting against the body wall 13 of the car, the air tunnel formed by the throat B and plate A is firmly held in position.

Mechanism for opening and closing the door C and maintaining it at such positions may be of any suitable form. I prefer to employ the following parts. In the illustration given, a cross-plate 14 is provided with reduced extensions 15 which extend through and engage slots 16 in the throat. Preferably the cross-plate is secured at one side of the center of the throat. A lever arm 17 is pivotally secured to the cross-plate 14 at an intermediate point between the center of the cross-plate and one end. At its outer end, the lever is provided preferably with a tapered edge 18 which is adapted to bear against the inner surface of the cover. At its inner end, the lever 17 is turned or twisted, as illustrated at Figs. 3 and 4, to form a thumb piece 19 which lies in a plane at substantially right angles to the plane of the lever. The thumb piece 19 is adapted to strike the cross-plate 14 and thus to serve as a stop against downward movement of the outer end of the lever. The thumb piece 19 is perforated at 20 to receive one end of a spring 21. The other end of the spring 21 engages the perforation 9 in the rivet member 8. With the arrangement shown, the spring 21, during the opening and closing of the door C, swings from one side of the pivot to the other. Thus it serves to hold the lever member in closed position and likewise serves to hold the lever in open position.

The cross-plate 18, in addition to acting as a support for the lever 17, serves to brace the throat B and to permit the use of relatively thin material in forming the member. With the plate member A braced by contact with the body wall 13 and the inner end of the throat braced by contact with the inner lining wall 12 and with the intermediate portion strengthened by the cross-plate or rib 14, the air-tunnel even though formed of relatively thin material is serviceable and sturdy.

In order to secure the inner lining 12 evenly about the inner edge of throat B, a ring member 22 may be employed.

In securing the attachment ventilator in position, a circular opening is first cut through the body wall and inner lining of the car at the desired point, an operation which may be accomplished very easily and accurately with tools now available. The throat B, with the ears 11 extended, is then passed through the opening until the flange of plate A rests against the face of the body wall 13. A ring 22 is then placed about the ears 11 and pressed against the inner lining 12. The ears 11 may then be pressed back against the ring 22, clamping the ring between them and the inner lining. It is preferred to have the ear members 11 sufficiently long to permit the attachment to be adjusted to cars having body walls and linings of various thicknesses.

The plate member may then be rotated to the proper position, the throat member turning freely within the circular opening in the body wall and inner lining. Holes are then drilled through the body wall 13 in alignment with the openings 1. Screws 23 are then passed through the opening 1 and body wall 13, the screws cutting their own threads in the body wall as they are passed therethrough. Before the screw heads are tightened against the plate member A, the plate may be given a further adjustment to accurate positioning of the ventilator, the elongated openings 1 permitting further rotation of the ventilating device.

The door C may be opened or closed by swinging the thumb piece 19 from one side to the other. Tension is exerted upon the only moving parts of the device, the lever 17 and the door C, at all times, with the consequent elimination of rattling. The telescoping hinges 3 and 4 provide a long engaging surface and hold the parts in true alignment.

In the operation of the door C, it will be observed that the stepped-forward portion 2 of the plate member A enables the door to be supported at a spaced distance from the plate member A and the marginal flange 7 of the door engages the body wall 13 of the car at a point adjacent the outer edge of plate A. The door C serves not only to enclose the plate member A but also to house the heads of screws 23.

In order to secure a circulation of cool air through the driver's compartment, I prefer to arrange the ventilators as shown in Fig. 2. Assuming that the exhaust is on the righthand side of the car, the ventilator is turned so that the door C opens rearwardly. On the righthand side of the car, the ventilator is turned so that the door face is in a forward direction to receive the cool air. Cool air passes through the air tunnel of the ventilator on the lefthand side of the car and circulates through the compartment and out of the ventilator on the righthand side of the car. The door of the ventilator on the righthand side of the car produces a suction which aids in inducing the uni-directional current through the driver's compartment.

In forming the plate A and throat B as a unitary structure, I prefer to use the following method. The plate A is drawn to form a cup, the sides of the cup corresponding to the walls of throat B. I then employ a punch and die to cut out the bottom of the cup so as to leave the ear segments 11 together with a marginal edge portion of the bottom wall. A straight punch is then employed to straighten the ears 11 and marginal edge portion, the latter forming a slight extension of the throat wall. The air tunnel member is now ready to be introduced into a circular opening cut through the body and lining of a car.

The foregoing detailed description has been given for clearness of understanding only and no unnecessary limitations should be understood therefrom, but the appended claims should be construed as broadly as permissible in view of the prior art.

I claim:

1. In a device of the character set forth, a casing member adapted to extend through an opening in a vehicle, a cross piece supported therein, a hinged door member adapted to close said opening, and a lever member pivotally secured to said cross member and having an end slidably contacting said door.

2. In a device of the character set forth, a throat casing member adapted to extend through an opening in a vehicle, a cross-plate secured thereto, an actuating lever pivotally secured to said cross-plate at a point to one side of the center of said plate, and a door adapted to close said opening and actuated by slidable contact with the end of said lever.

3. In a device of the character set forth, a throat casing member adapted to extend through an opening in a vehicle, a cross piece eccentrically supported therein, an actuating lever pivotally secured to said cross piece at one side of the center of said cross piece, a cover adapted to open and close said opening, and a spring connected to said cover and to the lower portion of said lever.

4. In a device of the character set forth, a throat casing member provided with a flange, said throat being adapted to extend through an opening in a vehicle, a cover hingedly connected to said flange and provided centrally with a perforated rivet member, a cross-plate secured in said throat member, a lever pivotally secured to said cross-plate and having one end adapted to slidably engage said door, and a spring connecting said rivet member to said lever.

5. In combination with a vehicle, a pair of ventilators secured on opposite sides of the vehicle and each comprising an air tunnel member and a hinged door adapted to open and close said tunnel, the ventilator door at one side of said vehicle being placed to open in a forward direction and the door on the other side of said vehicle being placed so as to open in a rearward direction.

6. In a device of the character set forth, a casing member adapted to extend through an opening in a vehicle, a hinged door member adapted to close said opening, a lever member pivotally supported in said casing member and having an end slidably contacting said door, and spring controlled means for maintaining said door in open and closed position.

In testimony whereof, I hereunto set my hand.

GEORGE H. KOONS.